(12) United States Patent
Nolasco et al.

(10) Patent No.: US 8,714,894 B2
(45) Date of Patent: May 6, 2014

(54) DRIVE-OVER COLLAPSIBLE FENDER (75) Inventors: Javier Nolasco, Phoenix, AZ (US);
Larry Gardner, Buckeye, AZ (US)

(73) Assignee: U-Haul International, Inc.

( * ) Notice: Subject to any disclaimer, the term of this patent is extended or adjusted under 35 U.S.C. 154(b) by 476 days.

(21) Appl. No.: 12/404,973

(22) Filed: Mar. 16, 2009

(65) Prior Publication Data
US 2010/0232901 A1 Sep. 16, 2010

(51) Int. Cl.
B60P 7/08 (2006.01)

(52) U.S. Cl.
USPC .................................. 410/4; 410/67

(58) Field of Classification Search
USPC ................. 410/3, 4, 6, 7, 30, 49, 121, 66, 67;
280/152.2, 154, 849, 850, 851, 854;
296/198
See application file for complete search history.

(56) References Cited

U.S. PATENT DOCUMENTS

| 4,693,651 | A |   | 9/1987  | Stuart            |        |
|-----------|---|---|---------|-------------------|--------|
| 4,804,302 | A |   | 2/1989  | Andre             |        |
| 5,266,378 | A |   | 11/1993 | Stephenson et al. |        |
| 6,109,845 | A | * | 8/2000  | Kerr              | 410/65 |
| 6,502,841 | B1| * | 1/2003  | Skelcher          |        |
| 6,592,139 | B1| * | 7/2003  | Shanahan          |        |
| D505,896  | S |   | 6/2005  | Devitt            |        |
| 7,621,705 | B2| * | 11/2009 | Hillberry et al.  | 410/30 |

OTHER PUBLICATIONS

"Open Car / Auto Transport Trailers", p. 5 or 5. www.rollsrite.com/custombuilt.html, "www.rollsrite.com/custombuilt.html".
http://www.palmbeachtrailers.com/images/258_Picture_250.jpg, May 8, 2007 p. 1-3.

* cited by examiner

Primary Examiner — Stephen Gordon
(74) Attorney, Agent, or Firm — Richard E. Oney; Tiffany & Bosco, P.A.

(57) ABSTRACT

A fender assembly for a vehicle transport trailer includes a fender positioned over a side wheel of the transport trailer and a spring is coupled between the fender and the trailer frame. The spring urges the fender upward into an uncollapsed position wherein a portion of the fender is a first distance above the trailer platform. The spring also allows the fender to move downward to a collapsed position wherein the portion of the fender is a second, smaller distance above the trailer platform when the weight of a vehicle is placed on the fender. The fender assembly thereby allows the trailer to have a lower deck than conventional vehicle transport trailers.

21 Claims, 13 Drawing Sheets

DRIVE-OVER COLLAPSIBLE FENDER

BACKGROUND

The present invention relates to vehicle transport trailers. More particularly, it relates to a drive-over fender for a vehicle transport trailer that will collapse when a vehicle drives over it and return back to its original position as the vehicle weight is removed.

Drive-over fenders have previously been used on vehicle transport trailers. Typically, such fenders are used on trailers designed for transporting heavy equipment or automobiles. Drive-over fenders are used in order to provide a trailer with a lower deck, which provides a number of advantages, including improved trailer stability and a lower ramp height, which allows for easier loading of a vehicle onto the deck.

These previously-known drive-over fenders are positioned over the trailer tires and are fixed in height so that vehicles having a relatively wide wheelbase must drive over the fenders into position on the transport trailer. This requires the drive-over fenders to have a relatively low profile with respect to the trailer deck, i.e. to have a height that is a relatively small distance above the deck. Because the fenders also must have adequate clearance above the trailer tires, the required low profile of the fenders dictates the height of the deck above the ground and restricts the ability to provide a deck that is lower than that height.

It is an object of the present invention, therefore, to provide a drive-over fender for a transport trailer that allows the trailer to have a lower deck.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, there is provided a fender assembly for a vehicle transport trailer. The fender assembly includes a fender positioned over a side wheel of the transport trailer. A spring is coupled between the fender and the trailer frame. The spring urges the fender upward into an uncollapsed position wherein a portion of the fender is a first distance above the trailer platform. The spring also allows the fender to move downward to a collapsed position wherein the portion of the fender is a second, smaller distance above the trailer platform when the weight of a vehicle is placed on the fender. The fender assembly thereby allows the trailer to have a lower deck than conventional vehicle transport trailers.

According to one advantageous embodiment of the invention, the fender has a generally planar top portion with downwardly depending rear ramp, front ramp and side ramp portions. The fender is coupled to the trailer frame with coil springs and a leaf spring.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

Referring to the drawing figures, a fender assembly according to the present invention is generally designated by reference number 10. As shown in the drawings, the fender assembly 10 is used in association with a vehicle transport trailer 12. The trailer 12 includes a frame 14 that supports a generally planar, rectangular load supporting deck or platform 16 for supporting a vehicle to be transported 17, such as a truck. A supporting front wheel 18 and rear wheel 20 are arranged in tandem and located along each side of the platform 16. The wheels 18, 20 are mounted to the frame 14 in a conventional and well known manner.

Figure 4:
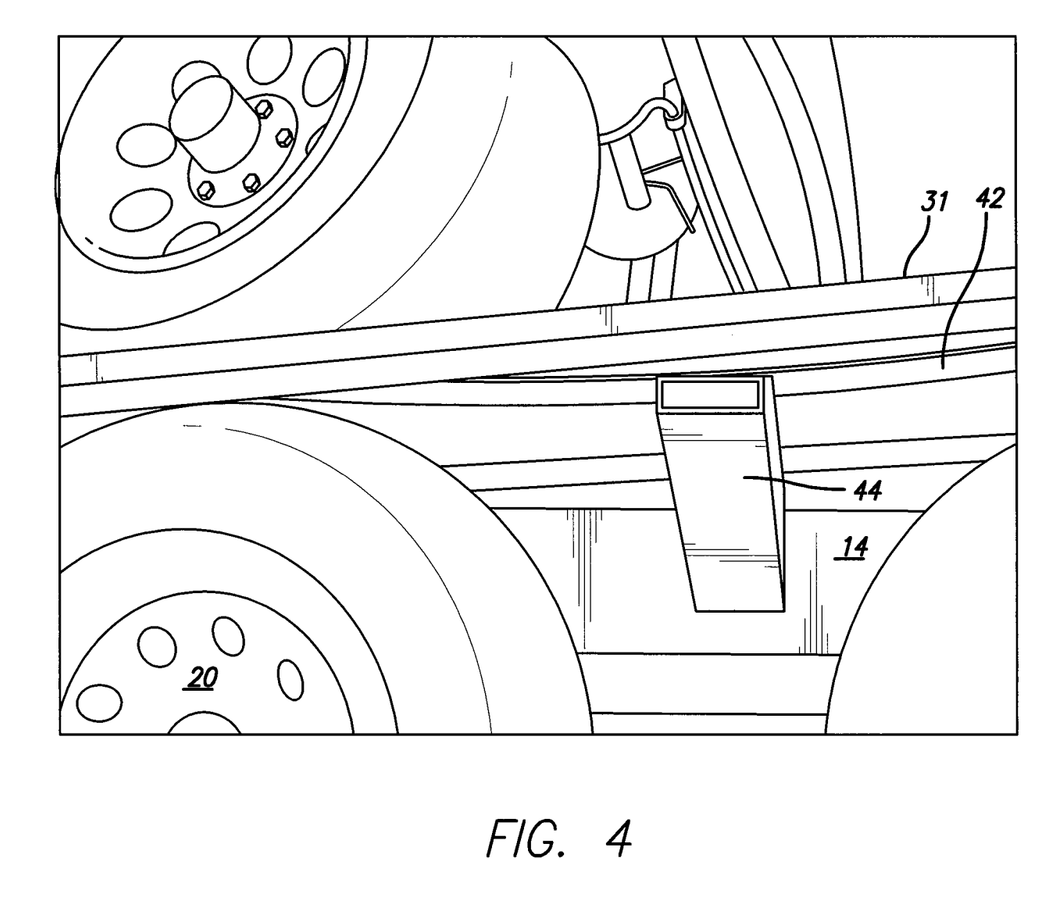
FIG. 4 is an enlarged view of a portion of the fender assembly of FIG. 1 in the collapsed position showing the leaf spring support member and leaf springs in more detail.
Figure 5:
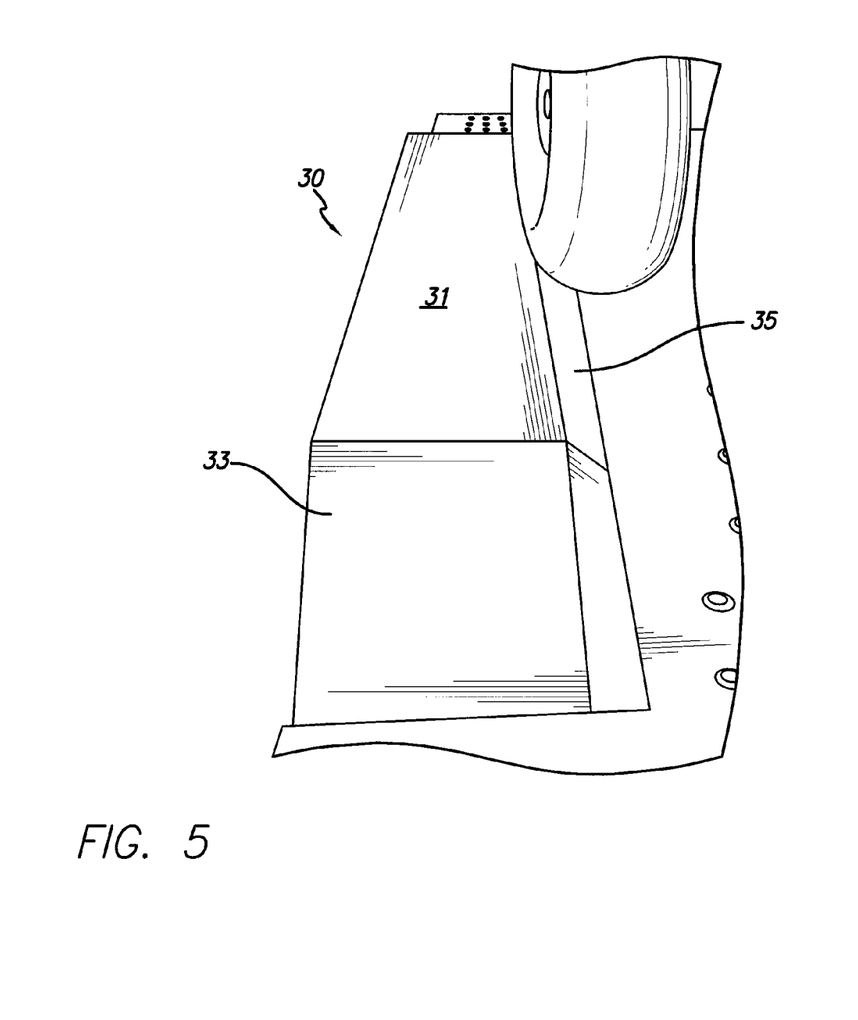
FIG. 5 is an end perspective view of the fender assembly of FIG. 1 in the collapsed position with a vehicle tire resting on the fender.
Figure 6:
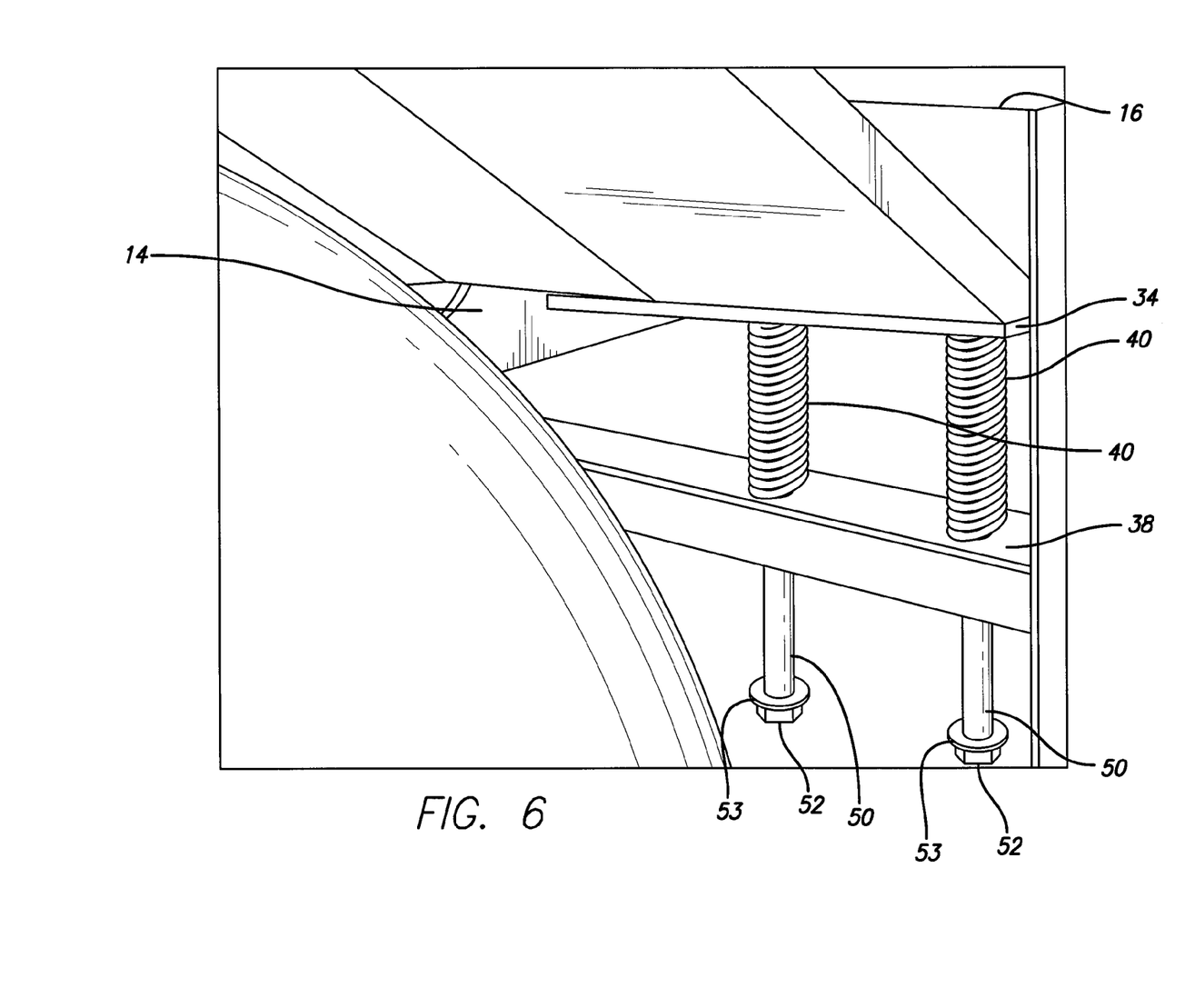
FIG. 6 is an enlarged view of a portion of the fender assembly of FIG. 1 in the collapsed position showing the coil springs and coil spring support in more detail.
Figure 7:
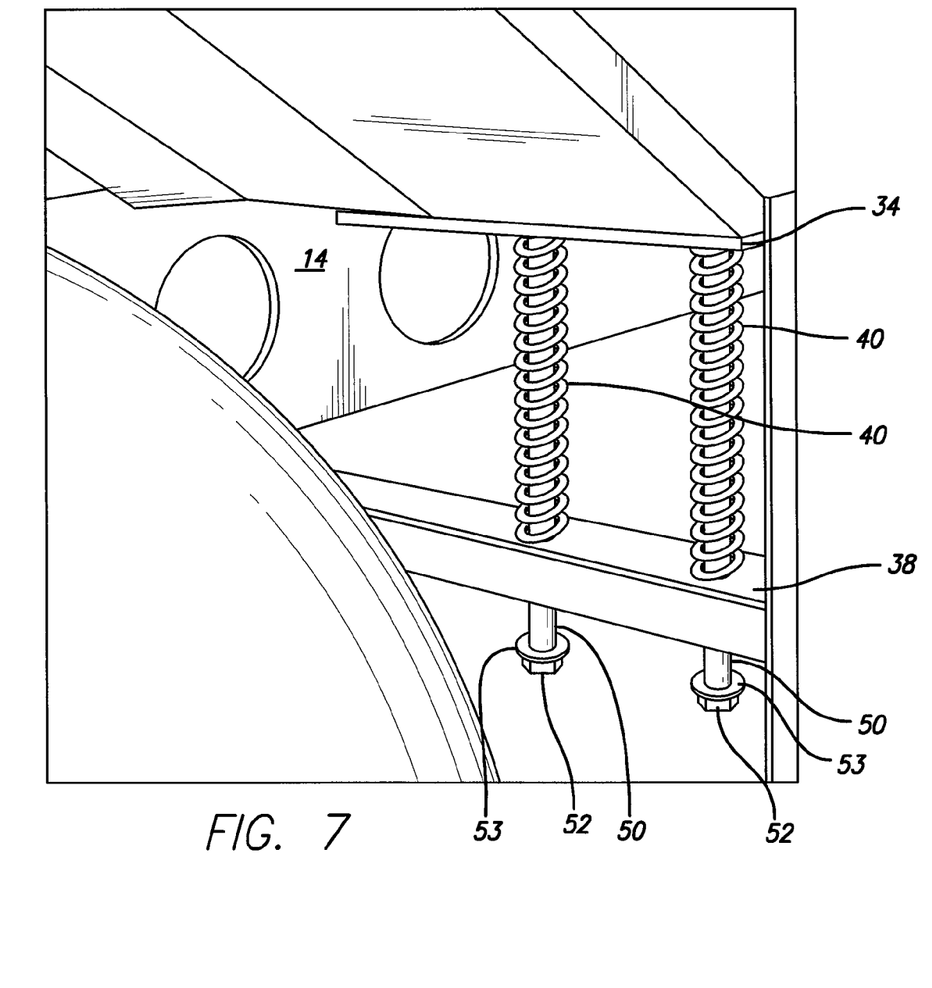
FIG. 7 is an enlarged view of a portion of the fender assembly of FIG. 1 in a partially collapsed position showing the coil springs and coil spring support in more detail.
Figure 8:
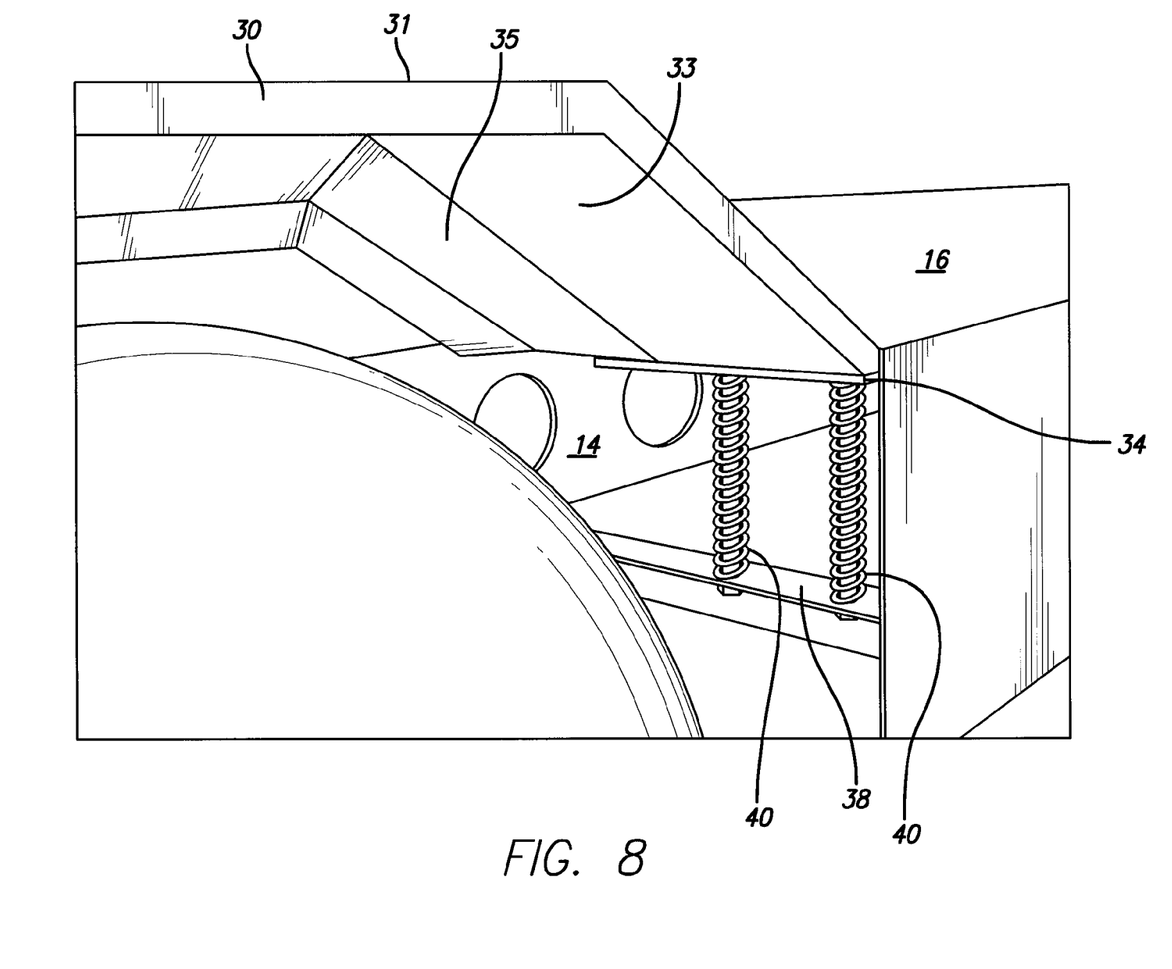
FIG. 8 is an enlarged view of a portion of the fender assembly of FIG. 1 in the uncollapsed position showing the coil springs and coil spring support in more detail.

Referring to FIGS. 2-9, the fender assembly 10 includes a fender 30 positioned over the trailer front wheel 18 and rear wheel 20 and within a void or cutout of the trailer platform 16. The fender 30 has a generally planar top 31 with a downward depending rear ramp 32 and front ramp 33. In addition, as shown in FIG. 5, a downward depending side ramp 35 extends along the length of the interior side of the fender top 31 and the rear and front ramps 33. A fender bracket 34 is mounted to the bottom of each the fender rear ramp 32 and front ramp 33. Each of the fender brackets 34 forms a tongue that extends underneath a portion of the platform 16, as shown in FIGS. 6-8. The fender is typically made of metal or another suitably durable material that will not be damaged when a vehicle tire drives over it. In one presently preferred embodiment, the fender is fabricated from 12-gauge steel that is bent to form the fender ramps 32, 33, 35, and the fender brackets 34 are fabricated from ½-inch plate steel (or two layers of ¼-inch plate steel) that are welded to each of the fender ramps 32, 33.

Still referring to FIGS. 6-8, the trailer frame 14 includes coil spring supports 38 that extend outwardly for supporting coil springs 40. Each of the coil springs 40 is mounted between one of the coil spring supports 38 and one of the fender brackets 34 and is held in place by a bolt 50, which extends through the interior of the spring 40. Each bolt 50 extends through a corresponding hole in the spring support 38 and has a head 52 positioned below the spring support and a threaded end that is screwed into a threaded hole in the fender bracket 34. Washers 53 can be placed on the bolt 50 below the spring support 38 to provide appropriate spacing to adjust the height of the fender 30 when the fender assembly 10 is in the uncollapsed position.

Figure 1:
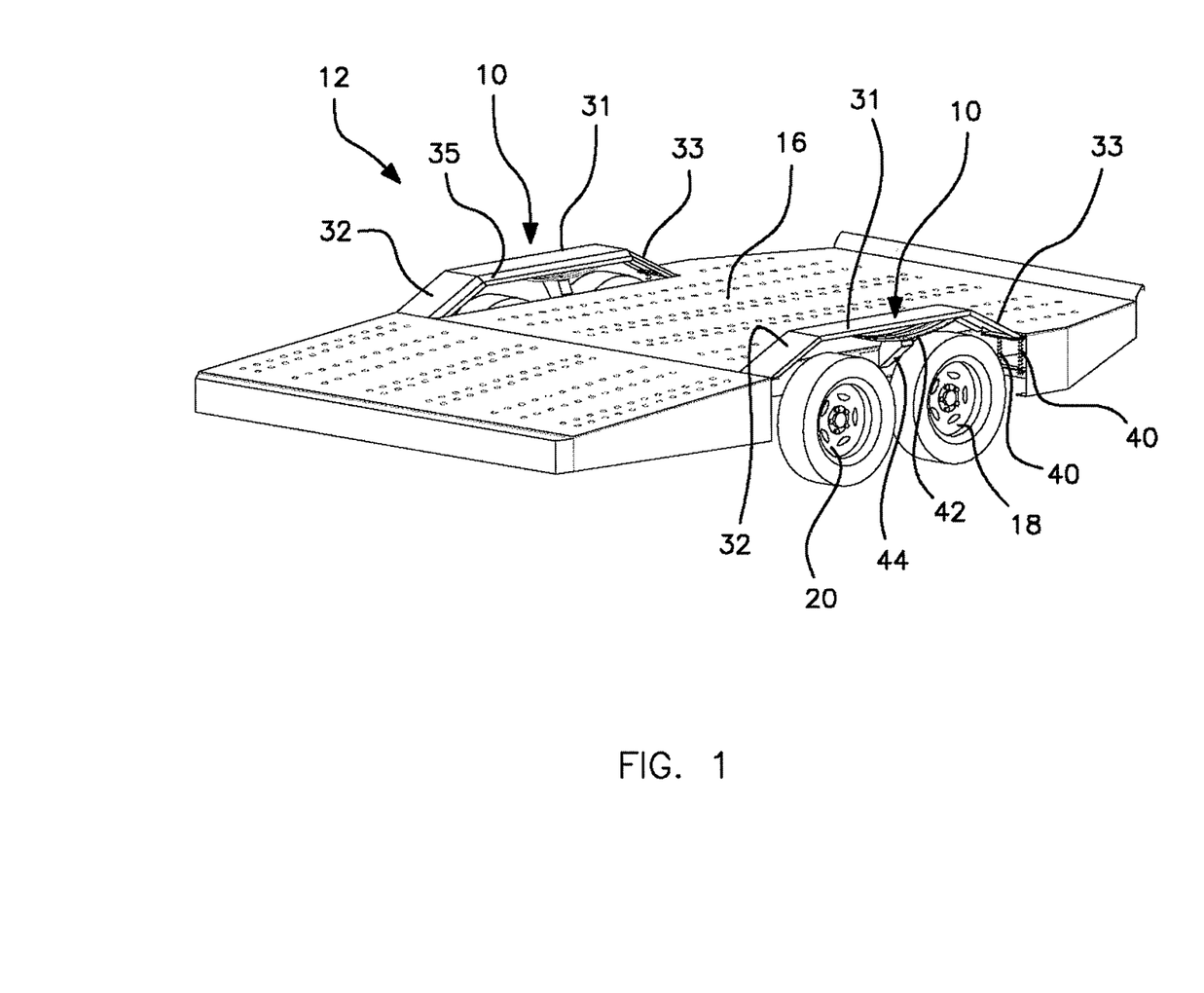
FIG. 1 is a perspective view of one embodiment of a transport trailer with collapsible drive-over fenders according to the present invention.
Figure 2:
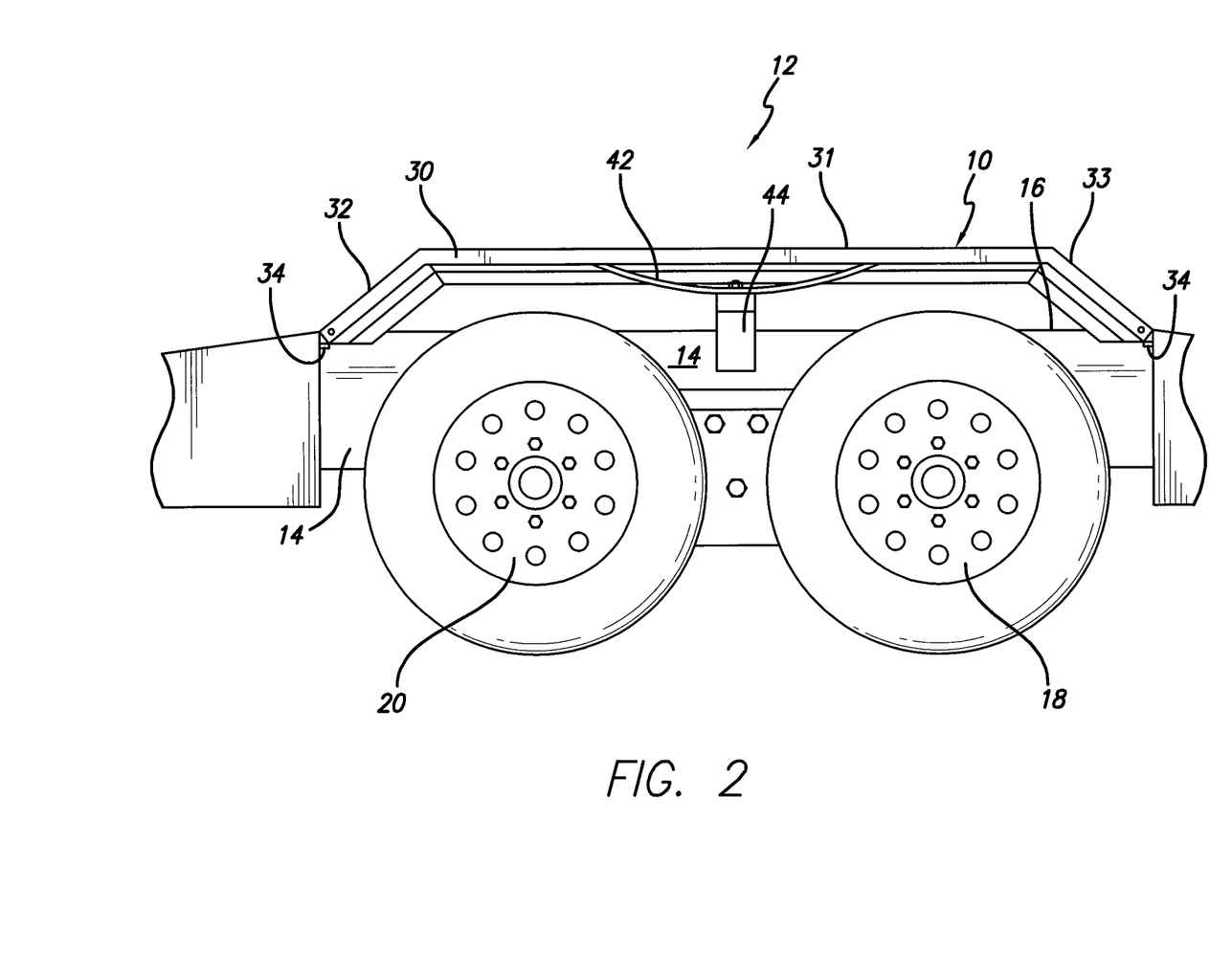
FIG. 2 is an enlarged side elevational view of one of the collapsible drive-over fenders of the trailer of FIG. 1, illustrating the fender's association with the trailer and supporting wheels.
Figure 3A:
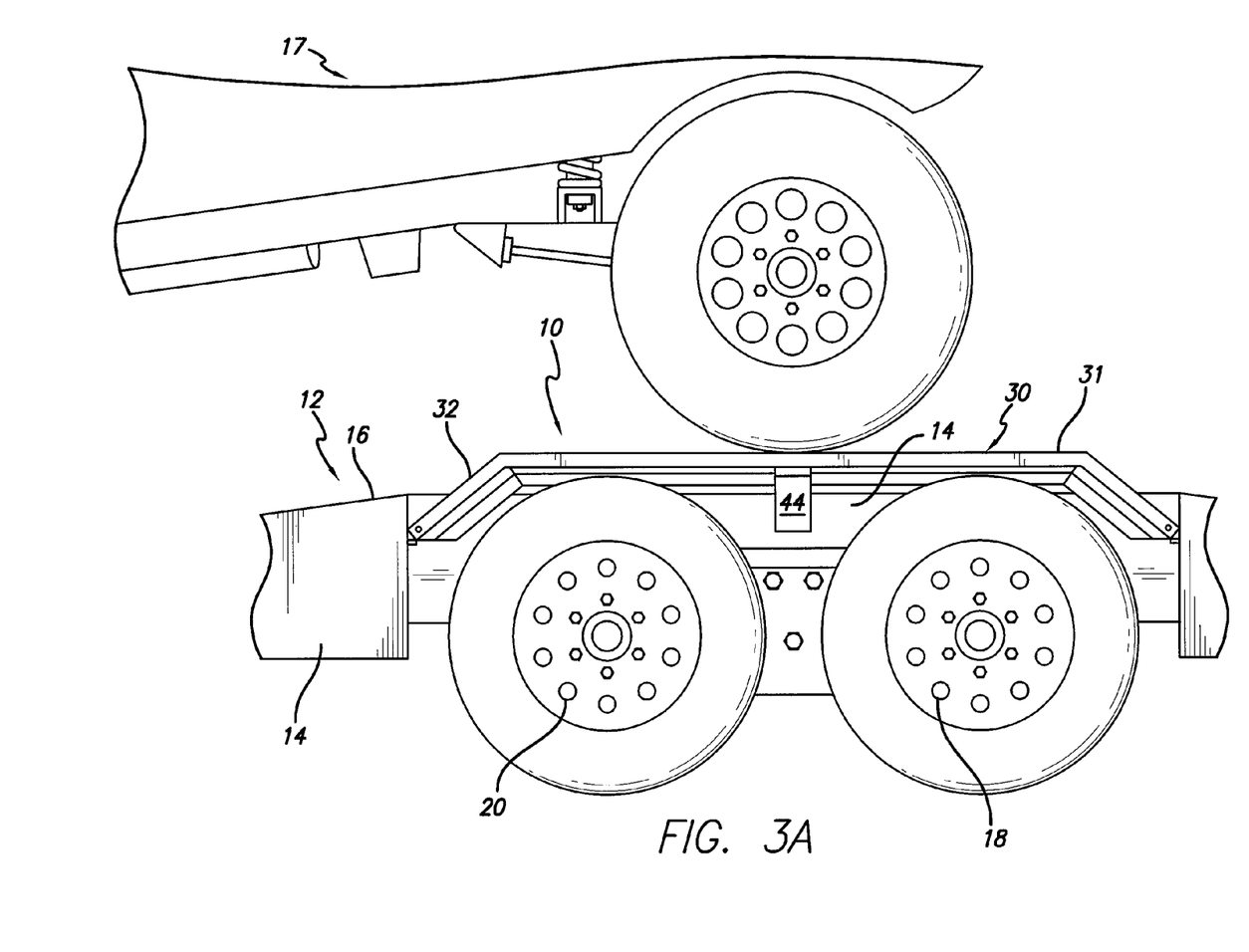
FIG. 3A is a side perspective view of the collapsible drive-over fender assembly of FIG. 1 showing the fender assembly in the collapsed position as a vehicle is moved onto the fender.
Figure 3B:
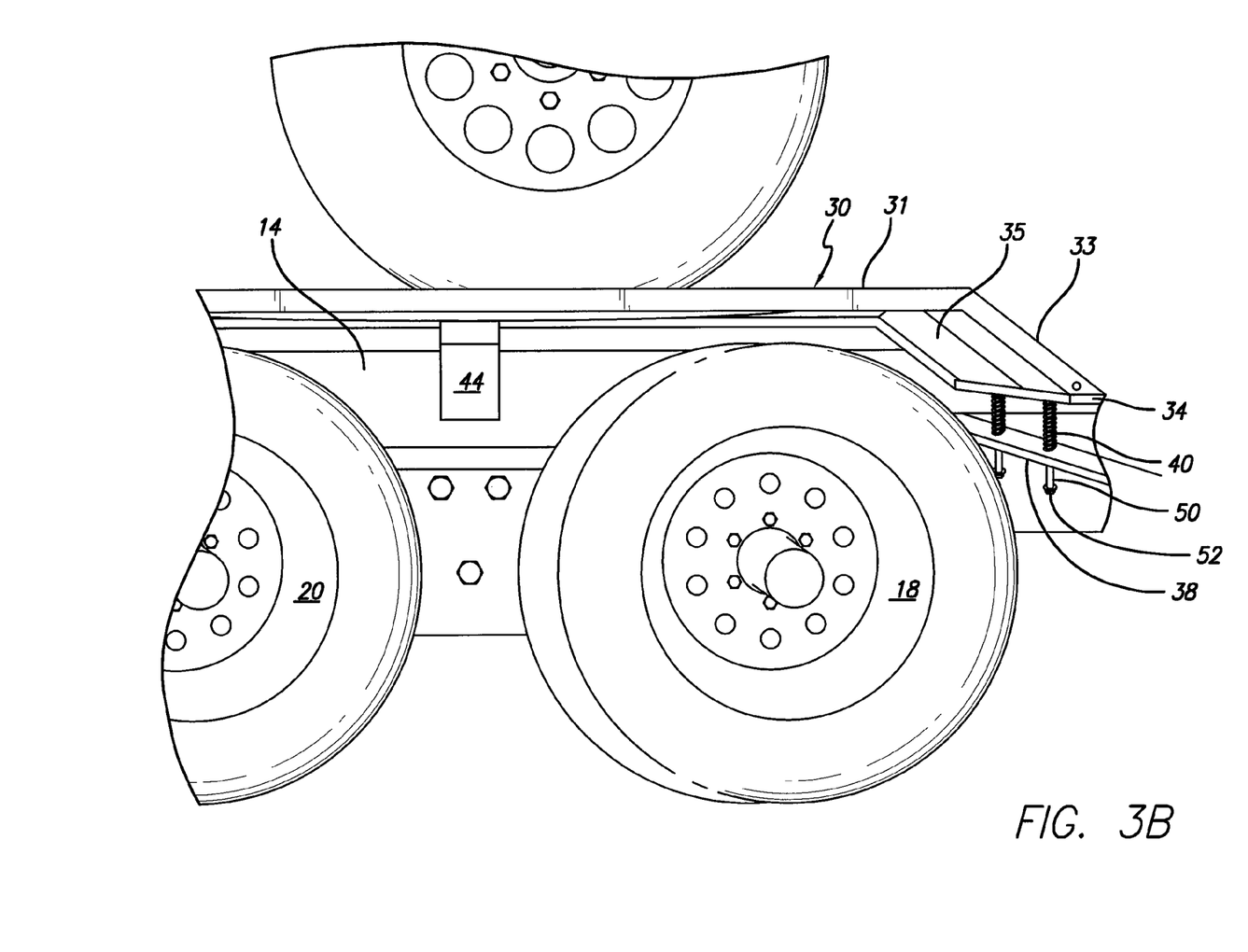
FIG. 3B is a side perspective view of a portion of the fender assembly of FIG. 1 in the collapsed position showing the coil springs and coil spring supports in more detail.
Figure 9:
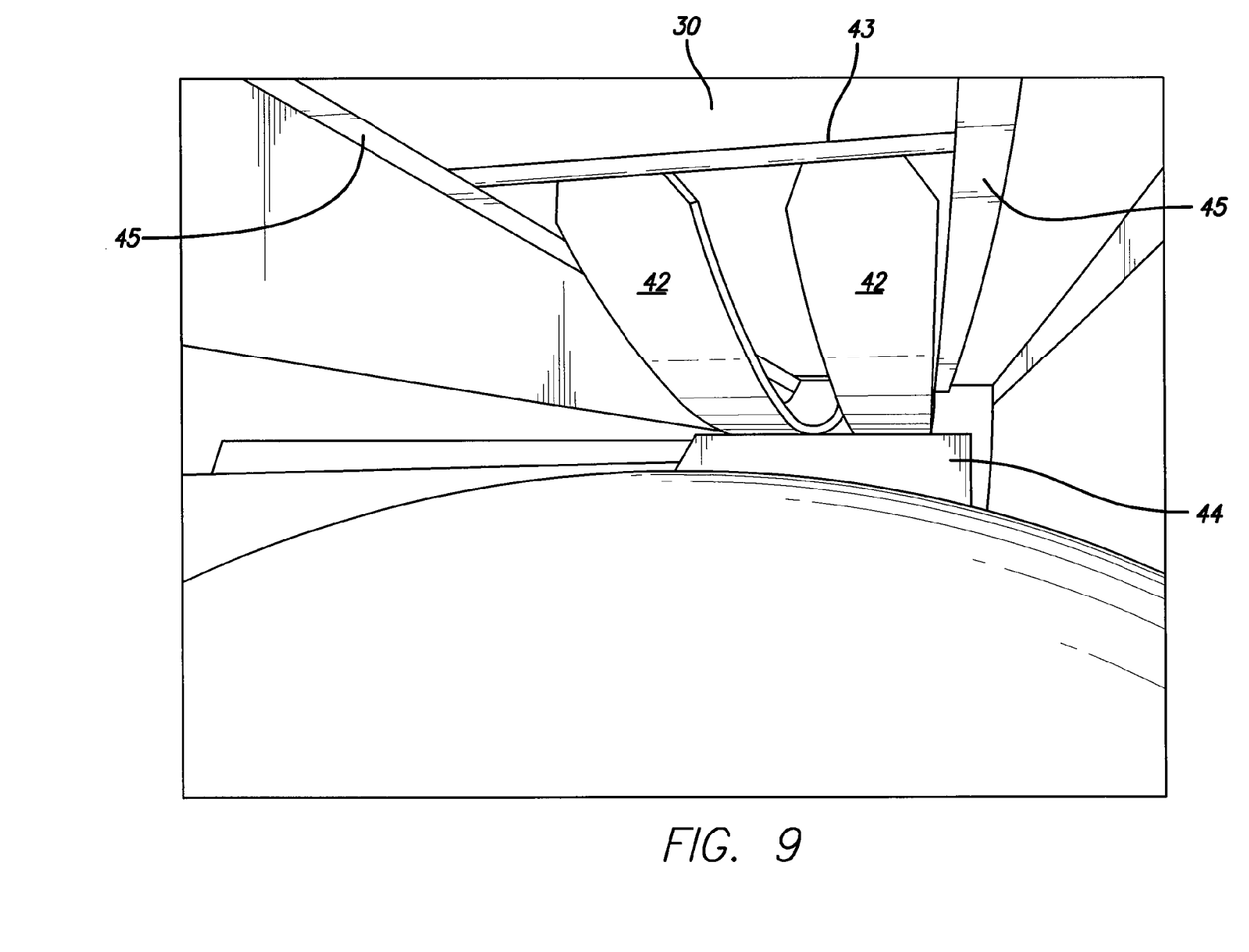
FIG. 9 is a perspective view of the underside of the fender assembly of FIG. 1 in the uncollapsed position showing the leaf springs and the leaf spring support in more detail.

As can be seen in FIGS. 2, 4 and 9, a pair of leaf springs 42 extends along a length of the underside of the fender top 31. As shown in FIG. 9, each of the ends of the pair of leaf springs 42 is slidably coupled to the fender 30 as described below. The center of each leaf spring 42 is bolted to a leaf spring support 44, which is fixedly mounted to and extends outwardly from the trailer frame 14 at a point between the wheels 18, 20. The leaf spring support 44 and leaf springs 42 support the center of the fender 30 and put upward tension on it. A transverse leaf spring rod 43 is connected to each of the front and rear ends of each pair of leaf springs 42. A pair of spaced rod channels 45 is disposed on the bottom of the fender 30 parallel to the leaf springs 42. The ends of the transverse rods 43 are disposed within the channels 45 so that as the leaf springs 42 flex up and down, the leaf spring rods 43 slide back and forth within the channels 45. The length of the channels 45 is greater than that of the leaf springs 42, so that when the fender 30 is in the fully collapsed position (see, e.g., FIG. 4), the transverse rods 43 do not slide out of the ends of the channels 45.

In this configuration, when no weight is placed on the fender 30, the coil springs 40 and leaf springs 42 urge the fender 30 upward into an uncollapsed position (see FIGS. 2 and 8) above and clear of the tires mounted on the side wheels 18, 20. In this uncollapsed position, the fender rear, front and side ramps 32, 33, 35 contact the underside of the trailer platform 16. When sufficient weight, such as that of the vehicle being transported, is placed on the fender 30, the coil springs 40 and leaf springs 42 are compressed and the fender 30 moves downward toward the wheels 18, 20 into a collapsed position (see, e.g., FIGS. 4 and 6). Thus, the fender assembly 10 allows for movement of the fender 30 between an uncompressed position above the tires mounted on the side wheels and a compressed position closer to the tires mounted on the side wheels.

Figure 10:
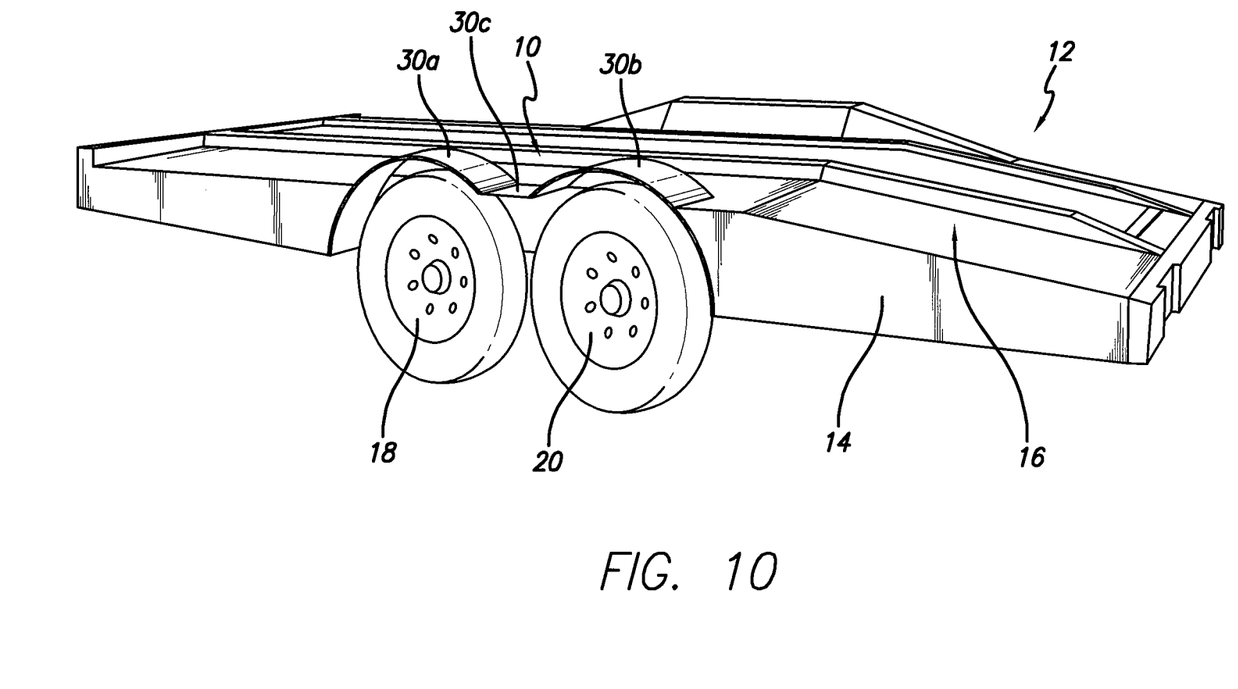
FIG. 10 is a perspective view of a second embodiment of a transport trailer with collapsible drive-over fenders according to the present invention, wherein the fenders include hinged, arcuately-shaped members.
Figure 11:
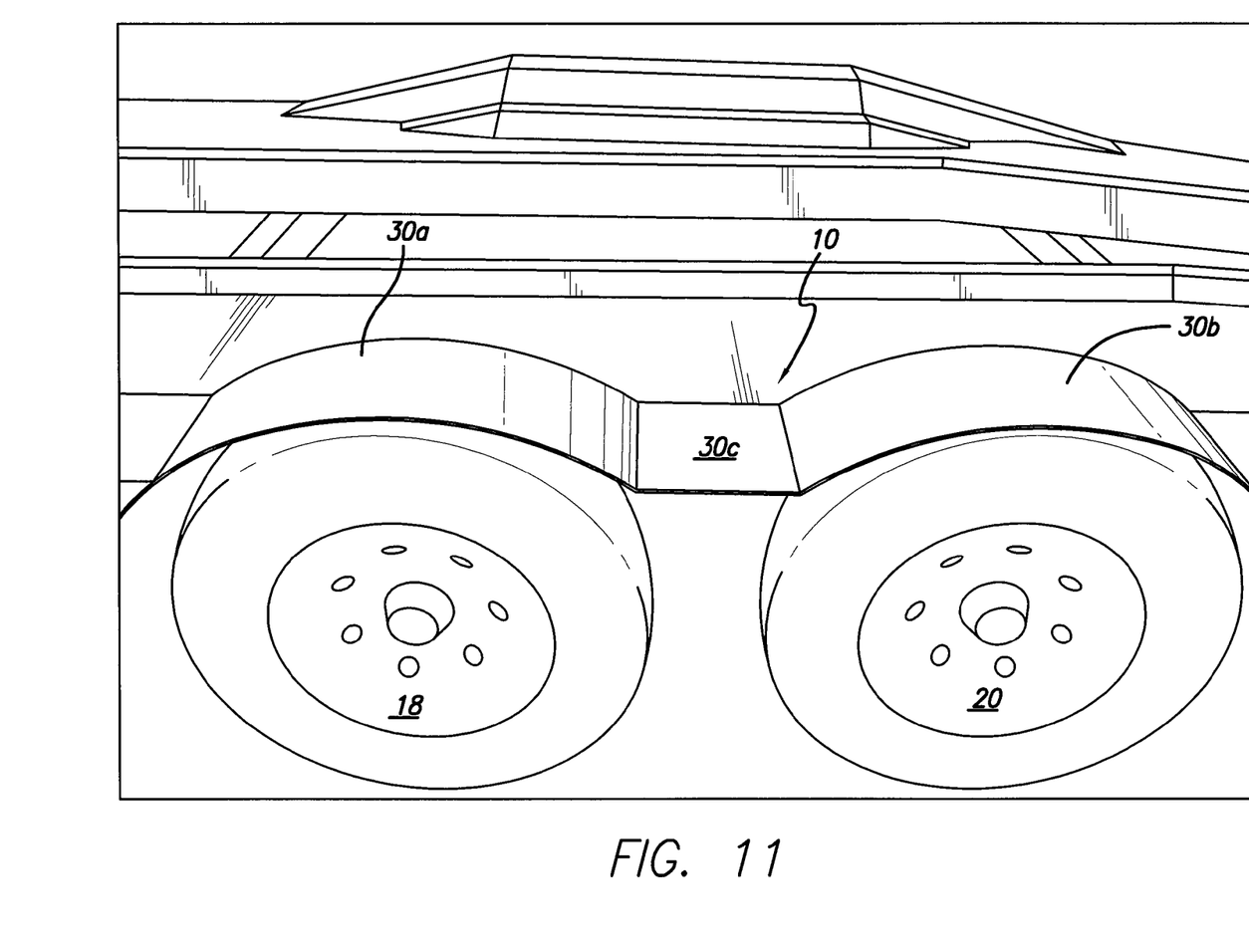
FIG. 11 is an enlarged side perspective view of one of the collapsible drive-over fender assemblies of the trailer of FIG. 10.
Figure 12:
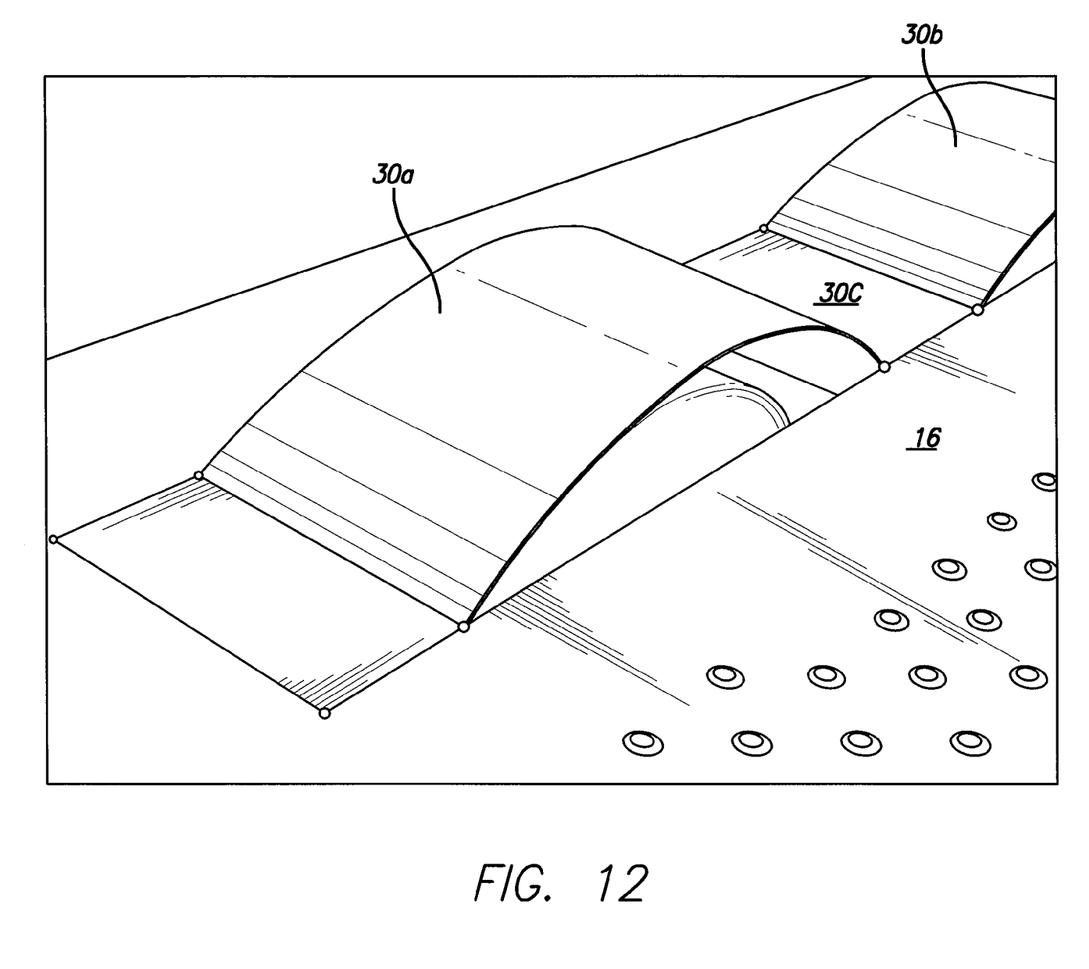
FIG. 12 is an enlarged perspective view of the collapsible drive-over fender of FIG. 10 showing the fender in relation to the trailer platform.

Referring to FIGS. 10-12, an alternative embodiment of a fender assembly 10 according to the invention is shown. The fender assembly 10 includes a front fender member 30a positioned over the trailer front wheel 18 and a rear fender member 30b positioned over the rear wheel 20. Each of the front fender member 30a and rear fender member 30b is generally arc-shaped. Between the front fender member 30a and the rear fender member 30b is a middle fender member 30c that is mounted to and forms part of the vehicle frame so that its top surface forms a generally planar extension of the platform 16. Each of the rear end of the front fender member 30a and the front end of the rear fender member 30b is connected to the middle fender member 30c with hinges (not shown). A fender bracket 34 similar to that previously described is mounted to the front fender member 30a at the end that is forward of the front wheel 18. A similar fender bracket 34 is mounted to the rear fender member 30b at the end that is rearward of the rear wheel 20. Each of the fender brackets 34 forms a tongue that extends underneath a portion of the platform 16.

Spring supports 38 are connected to and extend outwardly from the trailer frame 14 for supporting coil springs 40. Each of the coil springs 40 is mounted between one of the coil spring supports 38 and one of the fender brackets 34, in a manner similar to that previously described.

In this configuration, when no weight is placed upon the front or rear fender members 30a, 30b, the springs 40 urge those fender members 30a, 30b upward into the uncollapsed position (see FIGS. 10-12) above and clear of the tires mounted on the side wheels 18, 20, with the rear end of the front fender member 30a and the front end of the rear fender member 30b contacting the underside of the trailer platform 16. When sufficient weight, such as that of the vehicle being transported, is placed on either of the front or rear fender member 30a, 30b, the springs 40 are compressed and each of the fender member 30a, 30b pivots about its hinge downward toward the wheels 18, 20 into a collapsed position where the fender member 30a, 30b rests on the tire mounted on the wheel 18, 20. When the vehicle weight is removed, such as when a vehicle drives off the fender members 30a, 30b, the fender members will return to their original uncollapsed position.

A further aspect of the alternative embodiment of FIGS. 10-12 is that the front and rear fender members 30a, 30b also can serve as a chock for a vehicle positioned on the trailer. Each of the front and rear fender members 30a, 30b can compress to allow the vehicle tire to rest on the middle fender member 30c and then the compressed fender member 30a, 30b will pop-up to abut the back of the vehicle's tire, effectively automatically chocking the vehicle tire between the front and rear fender members 30a, 30c.

From the foregoing it will be apparent to those of skill in the art that a drive-over fender assembly and vehicle transport trailer in accordance with the present invention have numerous advantages. The drive-over fender provides adequate clearance above the trailer tires while at the same time allowing the transport trailer to have a lower deck.

Having read this disclosure, it will also be understood by those having skill in the art that the modifications may be made to the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A drive-over fender assembly for a vehicle transport trailer, the fender assembly comprising:

a trailer frame having a platform for supporting a vehicle;

a fender having a portion positioned over a side wheel of the transport trailer and a portion extending underneath a portion of the platform;

a spring coupled between the fender and the trailer frame, wherein the spring:

urges the fender upward into a first position wherein an upper portion of the fender is a first distance above the platform; and allows the fender to move downward to a second position in relation to the platform when a vehicle is rolled from the platform onto the fender so that a portion of the vehicle's weight is transferred onto the fender.

2. The drive-over fender assembly of claim 1 wherein the spring includes a coil spring.

3. The drive-over fender assembly of claim 1 wherein the spring includes a leaf spring.

4. The drive-over fender assembly of claim 1 wherein the fender is hingedly coupled to the trailer frame.

5. The drive-over fender assembly of claim 2 wherein the assembly further includes a leaf spring coupled between the fender and the trailer frame.

6. The drive-over fender assembly of claim 1 wherein the fender comprises a generally planar top portion, a downwardly depending rear ramp portion and downwardly depending front ramp portion.

7. The drive-over fender assembly of claim 1 wherein the fender comprises a downwardly depending side ramp portion.

8. A vehicle transport trailer comprising:

a trailer frame supporting a vehicle platform;

a side wheel supporting the trailer frame; and a fender assembly including:

a fender positioned, at least in part, over the side wheel; and a spring coupled between the fender and the trailer frame, wherein the spring urges the fender upward into a first position wherein a portion of the fender is a first distance above the platform when no weight is placed on the fender and allows the fender to move downward to a second position wherein the portion of the fender is a second, smaller distance from the platform when sufficient weight is placed on the fender;

wherein the fender assembly is configured so that a wheeled vehicle can be rolled from the platform onto the fender and the fender moves between the first position and the second position when the vehicle is rolled from the platform onto the fender.

9. The vehicle transport trailer of claim 8 wherein the spring includes a coil spring.

10. The vehicle transport trailer of claim 8 wherein the spring includes a leaf spring.

11. The vehicle transport trailer of claim 8 wherein the fender is hingedly coupled to the trailer frame.

12. The vehicle transport trailer of claim 8 wherein the fender comprises a generally planar top portion, a downwardly depending rear ramp portion and downwardly depending front ramp portion.

13. The vehicle transport trailer of claim 8 wherein the fender comprises a downwardly depending side ramp portion.

14. A vehicle transport trailer comprising:

a trailer frame supporting a vehicle platform;

a side wheel supporting the trailer frame;

a fender having a portion overlying the side wheel, wherein the fender is movable between a first position wherein the portion of the fender is a first distance above the platform and second position wherein the portion of the fender is a second, smaller distance from the platform;

wherein the fender is configured so that a wheeled vehicle can be rolled from the platform onto the fender; and spring means for urging the fender upward into the first position when no weight is placed on the fender and for allowing the fender to move to the second position when a wheeled vehicle is rolled from the platform onto the fender so that a portion of the vehicle's weight is transferred onto the fender.

15. The vehicle transport trailer of claim 14 wherein the spring means includes a coil spring coupled between the fender and the trailer frame.

16. The vehicle transport trailer of claim 14 wherein the spring means includes a leaf spring coupled between the fender and the trailer frame.

17. A vehicle transport trailer comprising:

a trailer frame supporting a vehicle platform;

a side wheel supporting the trailer frame; and a fender overlying at least a portion of the side wheel and movable between a first position wherein a portion of the fender is a first distance above the platform and second position wherein the portion of the fender is a second, smaller distance from the platform;

spring means for urging the fender upward into the first position when no weight is placed on the fender and for allowing the fender to move to the second position when the weight of a vehicle is placed on the fender;

wherein the spring means includes a coil spring coupled between the fender and the trailer frame.

18. The vehicle transport trailer of claim 14 wherein the fender is hingedly coupled to the trailer frame.

19. The vehicle transport trailer of claim 14 wherein the fender comprises a generally planar top portion, a downwardly depending rear ramp portion and downwardly depending front ramp portion.

20. The vehicle transport trailer of claim 14 wherein the fender comprises a downwardly depending side ramp portion.

21. The vehicle transport trailer of claim 17 wherein the spring means further includes a leaf spring coupled between the fender and the trailer frame.

* * * * *